United States Patent [19]

Stanley

[11] Patent Number: 5,405,288
[45] Date of Patent: Apr. 11, 1995

[54] DEVICES FOR GATHERING AND CLIPPING TUBULAR FOOD CASINGS AND FOOD STUFFING MACHINES EQUIPPED THEREWITH

[75] Inventor: Thomas R. Stanley, Georgetown, Ill.

[73] Assignee: Teepak, Inc., Westchester, Ill.

[21] Appl. No.: 233,653

[22] Filed: Apr. 26, 1994

[51] Int. Cl.⁶ .............................................. A22C 11/12
[52] U.S. Cl. ........................................ 452/48; 452/46; 29/243.56
[58] Field of Search ................... 452/48, 46; 29/243.56

[56] References Cited

U.S. PATENT DOCUMENTS

| Re. 30,196 | 1/1980 | Velarde | 29/243.59 |
|---|---|---|---|
| 3,751,764 | 8/1973 | Dobbert | 29/243.56 |
| 3,783,583 | 1/1974 | Dobbert | 29/243.56 |
| 4,001,926 | 1/1977 | Velarde | 29/243.56 |
| 4,044,450 | 8/1977 | Raudys et al. | 452/48 |
| 4,534,084 | 8/1985 | Stanley | 452/48 |
| 4,709,450 | 12/1987 | Stanley et al. | 452/48 |
| 4,766,713 | 8/1988 | Evans | 452/48 |
| 4,773,128 | 9/1988 | Stanley et al. | 452/48 |
| 4,796,332 | 1/1989 | Stanley | 452/48 |
| 4,821,485 | 4/1989 | Evans et al. | 452/48 |
| 5,087,462 | 2/1992 | Raudys et al. | 452/48 |
| 5,145,451 | 9/1992 | Staudenrausch | 452/48 |
| 5,221,228 | 6/1993 | Peproia | 452/48 |

FOREIGN PATENT DOCUMENTS 2546733 4/1977 Germany ..................... 452/48

Primary Examiner—Willis Little
Attorney, Agent, or Firm—Michael L. Dunn; Howard M. Ellis

[57] ABSTRACT

End-closures are formed on tubular food casings by means of a self-contained gathering and closing device comprising dual shutter assemblies with angular levers having thumb and finger extensions which are pivotally mounted from their respective thumb extensions for circumferentially gathering casing from a casing opening therebetween. The angular levers are positioned relative to one another such that when pivoted in the same direction travel in overlapping arcs to produce a narrowing of the casing opening as the levers converge. A punch is then actuated to apply an end-closure clip to the gathered casing.

21 Claims, 5 Drawing Sheets

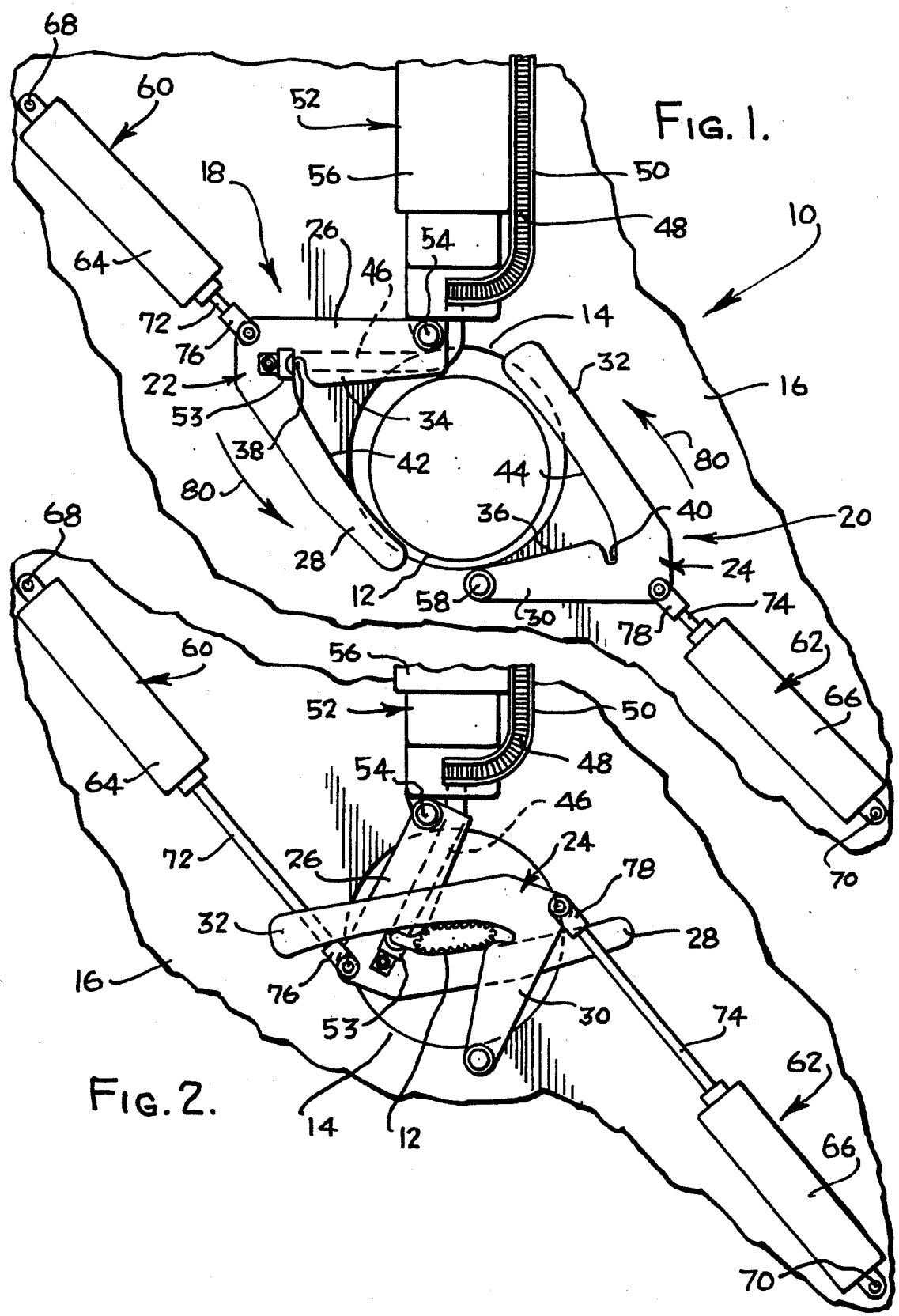

DEVICES FOR GATHERING AND CLIPPING TUBULAR FOOD CASINGS AND FOOD STUFFING MACHINES EQUIPPED THEREWITH

TECHNICAL FIELD

The present invention relates generally to improved devices utilized in packaging equipment, and more specifically, to devices used in conjunction with apparatus for stuffing and closing tubular food casings.

BACKGROUND OF THE INVENTION

In the manufacture of meat and sausage products, it is customary to prepare, for instance, a meat emulsion from comminuted meat together with fillers, seasonings, spices, etc. A tubular food casing, such as one prepared from nonedible cellulose is loaded onto the stuffing horn of a filling machine and stuffed with the meat emulsion. For sausage products like bologna and salami, etc., the meat emulsion is introduced into large, heavy walled fibrous type casings, for example, and formed into round shaped chubs or lengthy sausage sticks.

One example of a useful apparatus for stuffing large diameter sausage products like bologna is disclosed in U.S. Pat. No. 4,709,450 by Thomas R. Stanley et al. The disclosed apparatus is capable of producing sausage products with a high degree of dimensional uniformity which is especially important when meat packers cut lengthy sausage products into slices of predetermined thickness and diameter for prepackaging. The objective is to have a specific number of slices weigh precisely a predetermined amount for each package. The Stanley et al stuffing apparatus, which is capable of producing sausage products with substantially flat terminal ends for higher product yields, includes as part of the stuffing process casing closing steps consisting of gathering casing at each terminal end and applying end-closure clips thereto. This provides a firmly filed closed casing without product loss occurring.

In one embodiment of the Stanley et al invention, essentially identical dual casing gathering and clipping devices are employed, spaced somewhat from one another. Disposed between the casing gathering and clipping devices is a cutting mechanism for severing casing between the trailing chub clip of a leading filled product, and the leading horn clip of a trailing casing, next to be filled. One specific representative example of a gathering and clipping device disclosed by Stanley et al is the Z4141 model commercially available from Tipper Tie, Inc., Apex, N.C. Casing gathering and clipping devices of this type have a multiplicity of moving parts including die gates for supporting dies. In addition, they have spaced and opposing casing shutters offset in parallel planes for gathering casing at terminal ends by swinging in an interleaved arrangement. The casing gathering and clipping devices also include a clip punch mechanism with a magazine for storing and automatically feeding end-closure clips over gathered and compressed casing locked between casing shutters. A motorized punch rod upon actuation compresses the end-closure clip against a lower die member to secure the gathered casing and retain the end-closure in place.

The foregoing gathering and clipping devices have a number of shortcomings. For example, the devices rely on a multiplicity of component parts, can be costly to purchase and not substantially maintenance-free. One result is that machine operators need to interrupt filling operations in order to make adjustments in the devices. Frequently, shutters require adjustments for aligning the clip punch channel with the lower die member. Distortion from constantly striking clips between the die and channel also occurs. In addition to their mechanical features, such devices in the process of gathering casing for application of an end-closure clip fail to provide the desired uniformity to casing folds for producing more reliable end-closures.

Accordingly, there is need for a simpler, more economic, self-contained casing shutter and clipping device having fewer component parts for use in conjunction with food casing stuffing apparatus which will fully gather casing into at least initially a substantially horizontal plane wherein the end-closure has an even pattern of folds and compresses it into a small enough area for installation of an end-closure clip without the aid of other gathering components. The device should be capable of operating continuously and reliably without frequent interruptions and down time for adjustments and parts changeover.

SUMMARY OF THE INVENTION

It is therefore a principal object of the invention to provide for an improved device for gathering and closing tubular casings, and which requires only a pair of shutters for achieving more uniform patterns of folds in the gathering process. Such a device includes a clip channel and clip punch die which can be integral with one of the shutters.

More particularly, the device comprises first and second shutter assemblies. Each shutter assembly consists of an angular lever having thumb and finger extensions. The levers are pivotally mounted from their respective thumb extensions, which are generally shorter than their corresponding finger extensions, for circumferentially gathering casing from a casing opening therebetween. The angular levers are positioned relative to one another such that when pivoted in the same direction travel in overlapping arcs to produce a narrowing of the casing opening as the thumb and finger extensions converge. As the casing is gathered the shutter assemblies tend to first gather the casing in a generally horizontal flattened plane of even folded casing for more reliable end-closures.

It is a further principal object of the invention to provide for a casing gathering and closing device in which the angular levers are third class. The device may include (i) channel means for transmission of a casing fastener and for guiding a fastening ram of a clip punch, and (ii) a die against which a casing fastener is closed. Preferably, the channel means and die are integral with one of the shutter assemblies.

Accordingly, it is a principal object of the invention to provide for an improved food casing gathering and closing device as previously described in combination with a clip punch mechanism for compression of an end-closure clip around casing gathered into a small area to maintain the casing in a securely closed condition.

It is still a further object of the invention to provide a device for gathering and closing tubular casings comprising first and second shutter assemblies. Each assembly is comprised of an angular lever having thumb and finger extensions. The levers are pivotally mounted from their respective shorter thumb extensions for circumferentially gathering casing from a casing opening therebetween when rotated. Preferably, the angular lever of the first shutter assembly is equipped with channel means for a casing fastener and for guiding a ram of a clip punch, a die against which the casing fastener is closed, and motor means for pivoting the levers to gather casing, i.e., closing movement and for releasing casing, i.e., opening movement.

It is thus an object to provide a food casing gathering and closing device as previously described in combination with a clip punch mechanism for applying and compressing an end-closure clip for purposes of securely closing the terminal end of a filled casing.

It is yet a further object to provide a food casing gathering and closing device as previously described wherein the angular levers are positioned relative to one another such that when actuated travel in overlapping arcs producing a narrowing of the casing opening as the thumb and finger extensions of each assembly converge when pivoted or rotated in the same direction.

It is still a further object to provide the food gathering and closing device as previously described wherein the channel means and die are integral with the angular lever of the first shutter assembly. Similarly, the invention includes embodiments in which the channel means is integral with the first shutter assembly and the die is nonintegral with the shutter assembly. Also contemplated are embodiments of the device wherein the angular lever of the first shutter assembly is substantially the same breadth as the die.

It is a yet a further principal object of the invention to provide for a food casing stuffing machine in combination with any of the devices for gathering and closing tubular casings previously disclosed. This may include a food casing stuffing machine which utilizes shirred strands of casing, and comprises a food delivery section, a product sizing section, a product closing section and a product receiving and discharging section. The product closing section comprises a horn closing and clipping device in proximity to a stuffing horn for gathering, closing-off casing and applying a fastener onto the leading end of a food casing prior to stuffing with a meat product, and a chub closing and clipping device for gathering, closing-off casing and applying an end-closure fastener to the trailing end of the casing after being filled. Each of the horn and chub closing and clipping devices comprise first and second motor driven shutter assemblies. Each shutter assembly comprises an angular lever having thumb and finger extensions. The levers are pivotally mounted through their respective thumb extensions for circumferentially gathering and closing casing withdrawn from a filling horn of the food delivery section. The angular levers of each of the closing and clipping devices are positioned relative to one another such that when pivoted in the same direction travel in overlapping arcs to produce a gathering of the casing to form a casing closure as the thumb and finger extensions converge. Also included is a clip punch mechanism for delivering a casing fastener around the casing closure and for compressing the fastener closed.

It is still a further object to provide the food casing stuffing machine as previously discussed wherein the first shutter assembly of the closing and clipping devices includes (i) channel means for transmission of a casing fastener and for guiding the fastening ram of a motor driven clip punch device, and (ii) a die against which the casing fastener is closed. The food casing stuffing machine preferably includes cutting means for severing casing between the chub fastener and the horn fastener.

The present invention also contemplates a food casing stuffing machine which utilizes flattened lengths of casing, and especially those wound on a reel, instead of shirred type casing strands. In this regard, the apparatus comprises a casing supply section, a food delivery section, a casing carrier section for transporting casing from the casing supply section to the food delivery section, and a product closing section comprising leading and trailing devices for closing-off and applying end-closure fasteners to the leading and trailing ends of filled casings. Each of the leading and trailing devices consists of first and second motor driven shutter assemblies. Each shutter assembly comprises an angular lever having thumb and finger extensions. The levers are pivotally mounted through their respective thumb extensions for circumferentially gathering and closing casing at each end of the filled food casing. The angular levers of each shutter assembly are positioned relative to one another such that when pivoted travel in overlapping arcs to produce a gathering of casing and form a casing closure at each end of the casing as the thumb and finger extensions of each assembly converge. A clip punch mechanism is also included for delivering a casing fastener around the casing closure and for compressing the fastener against the gathered casing.

It is still an object of the invention to provide the food casing stuffing machine as previously discussed wherein the first shutter assembly of the leading and trailing devices includes (i) channel means for transmission of a casing fastener and for guiding a fastening ram of the clip punch device, and (ii) a die against which a casing fastener is closed. The food stuffing machine includes cutting means for severing casing.

BRIEF DESCRIPTION OF THE DRAWINGS

For a further understanding of the invention, as well as its characterizing features reference should now be made to the accompanying drawings wherein:

FIG. 1 is an end view of the device for gathering and closing tubular food casing prior to actuation;

FIG. 2 is an end view of the device of FIG. 1 showing the early stage of pivoting action of the shutter assembly in gathering casing and movement through an overlapping arc;

DESCRIPTION OF THE PREFERRED EMBODIMENTS

Figure 3:
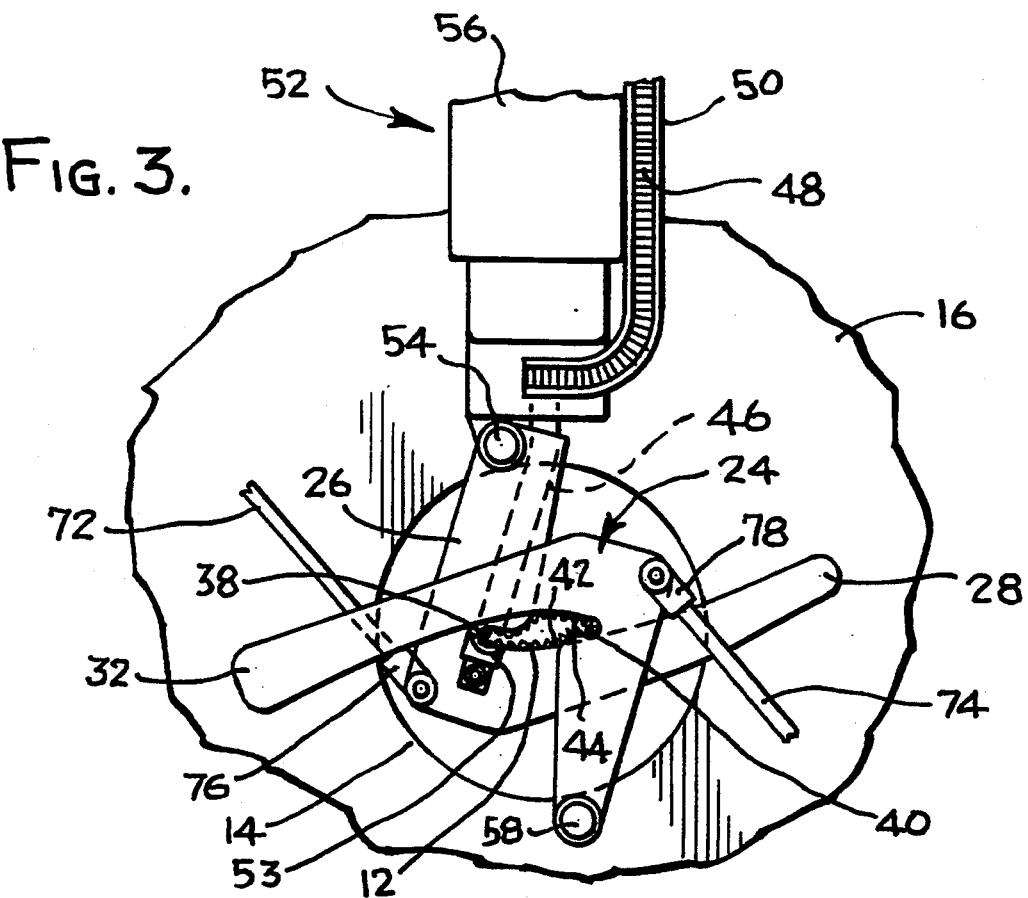
FIG. 3 is an end view of the device of FIG. 1 showing a further narrowing off the space between the shutter assemblies and drawing the terminal end casing closer together.

Turning first to FIG. 1, there is shown a device 10 for gathering and closing tubular food casing 12 positioned at the outlet end of a stuffing horn 14 of a filling apparatus. In order to best highlight the structural features of the device 10 other adjacent components of the filling apparatus are omitted from FIGS. 1–5. FIG. 1 depicts the device for gathering and closing tubular food casing before actuation. Thus, casing at the outlet end of stuffing horn 14 is shown in an open state before the terminal end portion has been gathered and a clip applied to secure the closure and prevent loss of meat product from occurring.

Gathering and closing device 10 is supported by standard 16. Device 10 consists of first shutter assembly 18 and second shutter assembly 20. Shutter assemblies 18 and 20 each comprise an angular lever 22 and 24, respectively of preferably one-piece construction. Lever 22 consists of a thumb extension 26 and a finger extension 28, wherein the thumb extension is generally shorter relative to the finger extension. Lever 24 also consists of a thumb extension 30 and a finger extension 32 which is longer relative to the thumb extension. The inside surfaces 34 and 36 of thumb extensions 26 and 30 are on an inclined plane with the highest point running towards finger extensions 28 and 32. At the apex of the inclined surfaces 34 and 36, each angular lever 22 and 24 has a casing notch 38 and 40 in the form of a slot. The inside surfaces 42 and 44 of finger extensions 28 and 32 continue inwardly at an acute angle.

Thumb extension 26 of angular lever 22 also has a linear channel 46 running the length of the member to casing notch 38. Channel 46 functions both as a passage for casing clips 48 shown being held in magazine 50 of clip punch 52, and as a guide for the fastening ram (not shown in FIG. 1) of the clip punch device. At the terminal end of channel 46 adjacent to the notch is punch die 53 against which casing clips are closed upon actuation of clip punch 52. Preferably, channel 46 and die 53 are integral with the angular lever of first shutter assembly 18. This aids in eliminating the need for interruptions during filing cycles in order to make alignment adjustments of the fastening ram with the die.

Angular lever 22 is mounted for rotation from its thumb extension by means of pin 54. Lever 22 is positioned adjacent to the base of clip punch motor 56. The objective is to position lever 22 so when rotated 90° channel 46 will be axially aligned with the clip punch in order to receive the fastening ram (see FIG. 5).

Angular lever 24 of the second shutter assembly is also mounted for rotation from its thumb extension 30 by means of a pin 58. Lever 24 is mounted so when rotated it will be immediately adjacent and slide past lever 22. Generally, lever 24 is positioned for rotation at a point approximately 180° from the connecting point of lever 22, and somewhat offset so it is not in direct alignment with the pivoting point of angular lever 22. That is, the axes of rotation for the levers are eccentric to one another, but positioned so when their levers are rotated their paths partially overlap, as best illustrated by FIGS. 2–5.

The shutter assemblies are rotationally driven in tandem by motor means 60 and 62 which may be consist of fluid cylinders 64 and 66 mounted to standard 16 through connecting pins 68 and 70. Rods 72 and 74 of the motor means are mounted to the heel of each angular lever through yokes 76 and 78. Directional arrows 80 show the direction of rotation of the angular levers when ititially actuated, i.e., both rotating in the same direction. This is further illustrated by FIG. 2, whereupon actuation of motor means 60 causes rod 72 to be axially translated outwardly to pivot angular lever 22 generally in a downward and counter clockwise direction. Likewise, actuation of motor 66 causes outward extension of rod 74 which produces a generally upward and counter clockwise rotational movement of angular lever 24. The rotational coaction of the shutter assemblies produces an initial narrowing of the opening between the two angular levers, and concomitantly a reduction in the diameter of tubular casing 12 as gathering of film in the path of the angular levers occurs. The coaction of the longer finger extensions of the angular levers serves to capture more distally positioned casing and gradually concentrate within the enclosed and reduced area defined by the angular levers as they pivot in the same direction. FIG. 2 also illustrates thumb extensions 26 and 30 at approximately parallel planes having moved to about a 65° angle from the position shown by FIG. 1. Casing 12 is shown initially gathered in a substantially horizontal plan and with uniform folds, the casing being gathered so that its cross section is in the form of an elongated ellipse.

FIG. 3 illustrates further coaction of the shutter assemblies as a result of rods 72 and 74 being translated further outwardly causing angular levers 22 and 24 to move to about a 75° angle from that illustrated by FIG. 1. The coaction of the shutters concentrates casing 12 in a still further reduced area defined by notches 38 and 40 and edges of the inside surfaces 42 and 44 of finger extensions 28 and 32.

Figure 4:
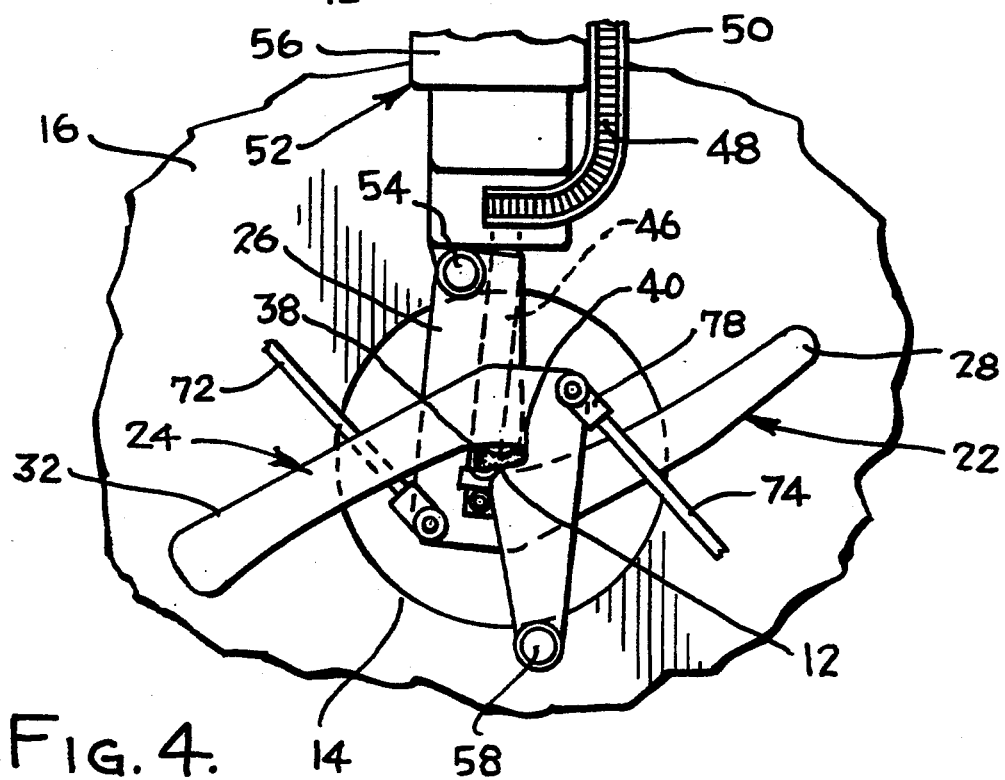
FIG. 4 is a further view of the device of FIG. 1 showing casing being consolidated into a notched area on the angular levers.

FIG. 4 shows further concentration of casing 12 almost exclusively between notches 38 and 40 as the shutters defined by the angular levers are pivoted to about an 85° angle from that illustrated by FIG. 1.

Figure 5:
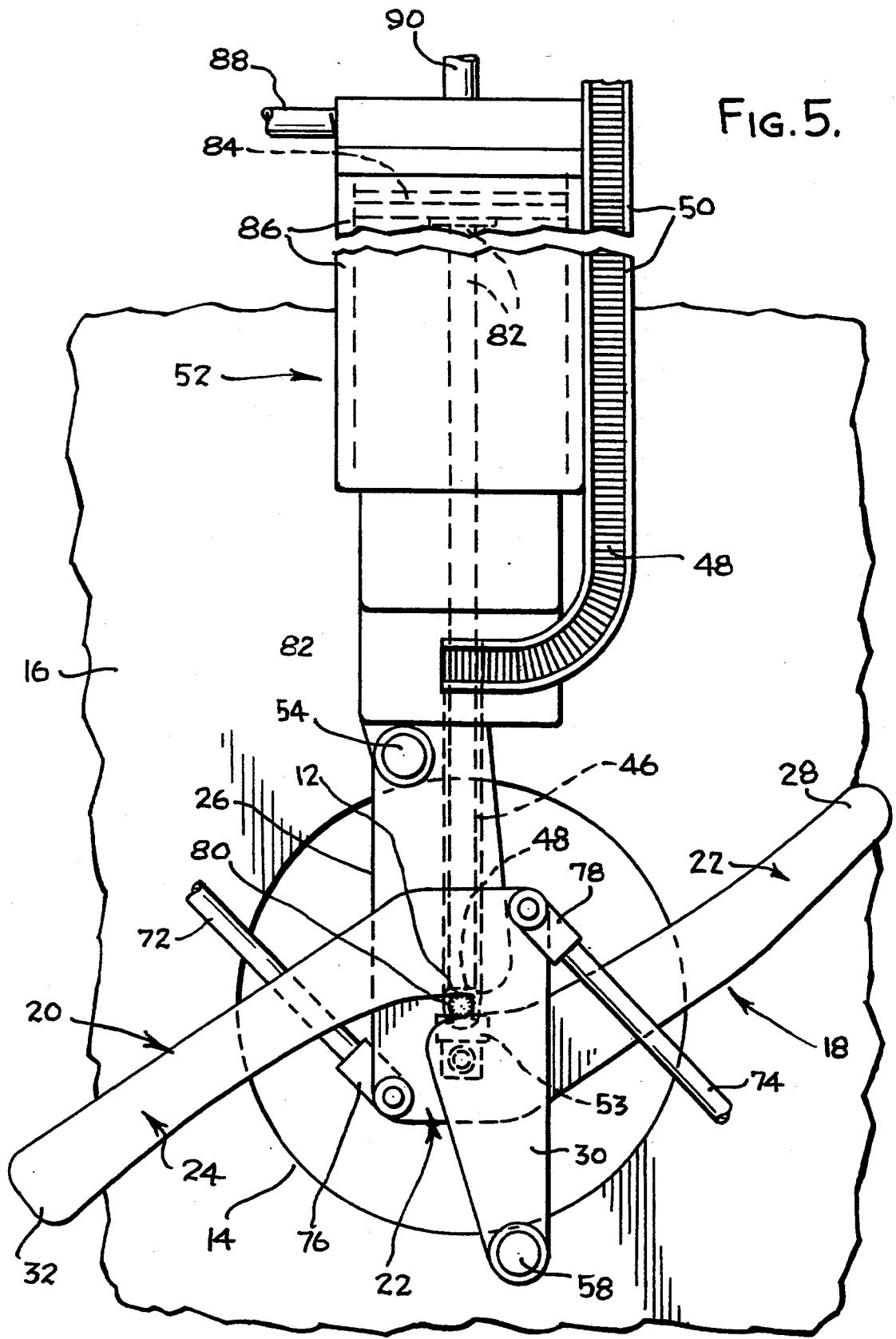
FIG. 5 is an end view showing the shutter assemblies fully closed with casing gathered in a small area defined by notches in the angular shutters, with an end-closure clip applied.

FIG. 5 shows the shutter assemblies of the casing gathering and closing device fully extended wherein casing 12 is fully gathered and compressed in area 80 formed from notches 38 and 40. Casing 12 in area 80 is sufficiently compressed to receive an end closure clip 48 loaded on magazine 50. Angular levers 22 and 24 are shown sufficiently pivoted, i.e., 90° so as to axially align channel 46 of thumb extension 26 with fastening ram 82 of clip punch mechanism 52 of conventional design. Such clip punch devices are characterized by piston 84 affixed to ram 82, which may be spring loaded (not shown) for movement in fluid cylinder 86. The clip punch is actuated by introducing a fluid, usually air, through inlet 88 forcing piston 84, and fastening ram 82 in a downwardly direction through ram guide 46, carrying with it an end-closure clip 48 for application to casing 12 gathered in area 80. The clip is deformed against clip die 53. Fastening ram 82 and piston 84 are then released by withdrawing fluid through outlet 90 allowing the spring loaded piston and fastening ram to be retracted from channel 46 of angular lever 22. Rods 72 and 74 are then retracted by reversing motor means 60 and 62 to open the shutter assemblies. The gathering and clipping cycle can then be repeated.

The foregoing devices as previously described may be adapted for use with a wide range of stuffing machines utilized in the meat packing industry. For example, they can be used with full muscle stuffing apparatus; stuffing equipment especially adapted for shirred casings, including large size sausage products where meat emulsion is packaged in the preparing of salami, bologna, pepperoni, and other similar type sausage products, as well as apparatus for stuffing chunk, sectioned and formed meat type products filled in flattened casing wound on reels, such as described in U.S. Pat.

No. 4,534,084 by Thomas R. Stanley. Other representative stuffing apparatus suitable for adoption of the devices for gathering and closing tubular food casing described herein include the machines disclosed in U.S. Pat. Nos. 4,709,450 and 4,773,128 by Thomas R. Stanley and Mark R. Zeleznik. The contents of the foregoing United States Patents are hereby incorporated-by-reference herein.

Figure 6:
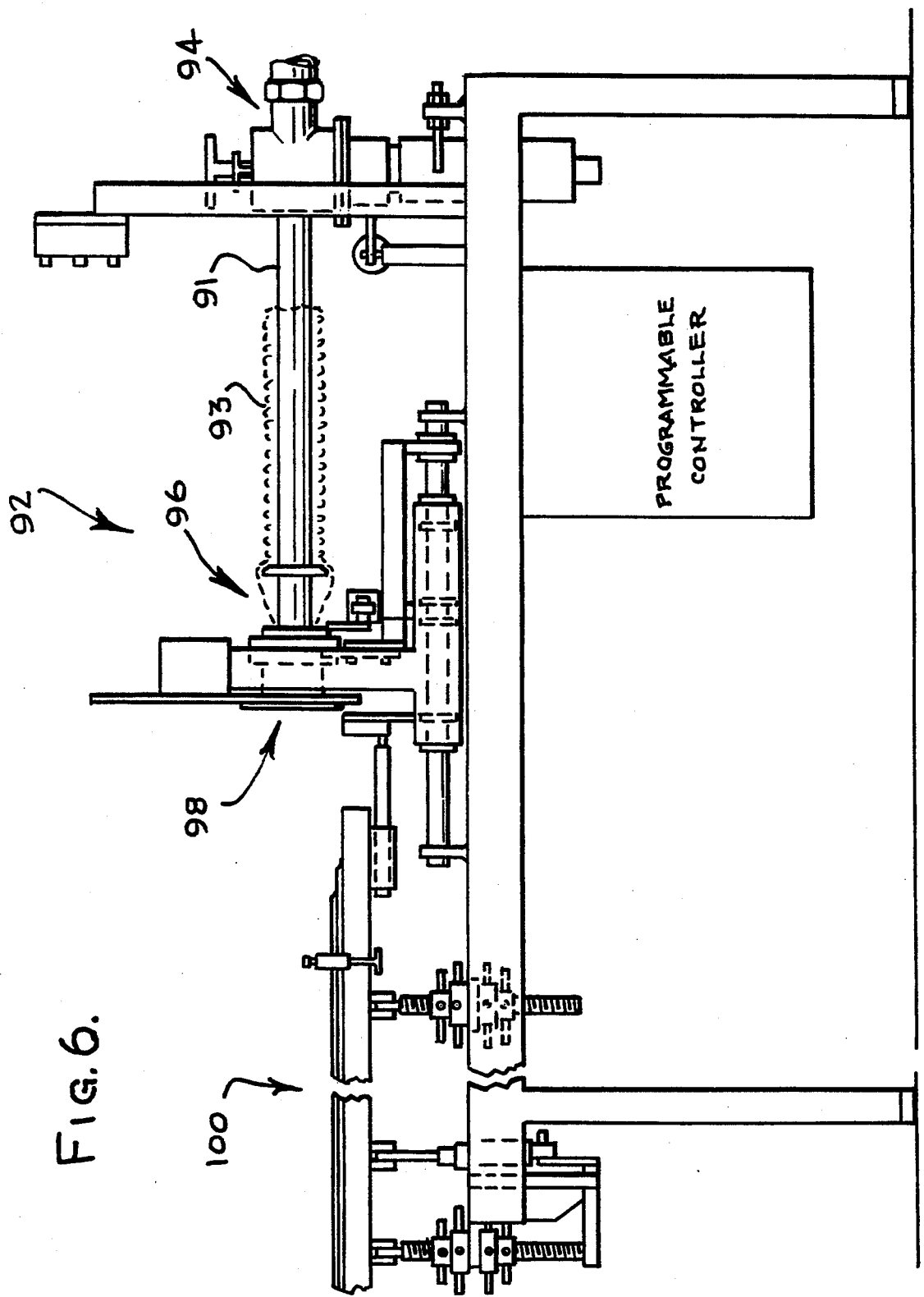
FIG. 6 is a side elevational view of a shirred casing food stuffing machine equipped with a plurality of the devices of FIG. 5.

FIG. 6 relates to a stuffing apparatus 92 of the type disclosed in the above latter two patents. Apparatus 92 consists of the following main sections: food delivery section 94 consisting of such key components as a meat pump (not shown) and a stuffing horn 91 for receiving a pressurized meat emulsion and for holding a supply of food casing 93, usually folded by shirring techniques well known in the art, and for delivering the meat emulsion to the interior of the casing; a product sizing section 96 consisting mainly of compression means for controlling the rate of release of casing from the stuffing horn and for regulating the diameter of the product as it is being filled with the meat emulsion; a product closing section 98 consisting of dual spaced devices for gathering casing at the terminal ends of each sausage product, the devices corresponding to those previously described hereinabove. The dual spaced devices of closing section 98 may consist of a horn clipping device in closest proximity to the stuffing horn and chub clipping device spaced downstream from the horn clipping device. A device for severing casing (not shown) is positioned between each of the horn and chub clipping devices. Apparatus 92 also includes a discharge section which receives a filled and closed casing from the closing section 98 on dump table 100 and discharges it from the apparatus.

Figure 7:
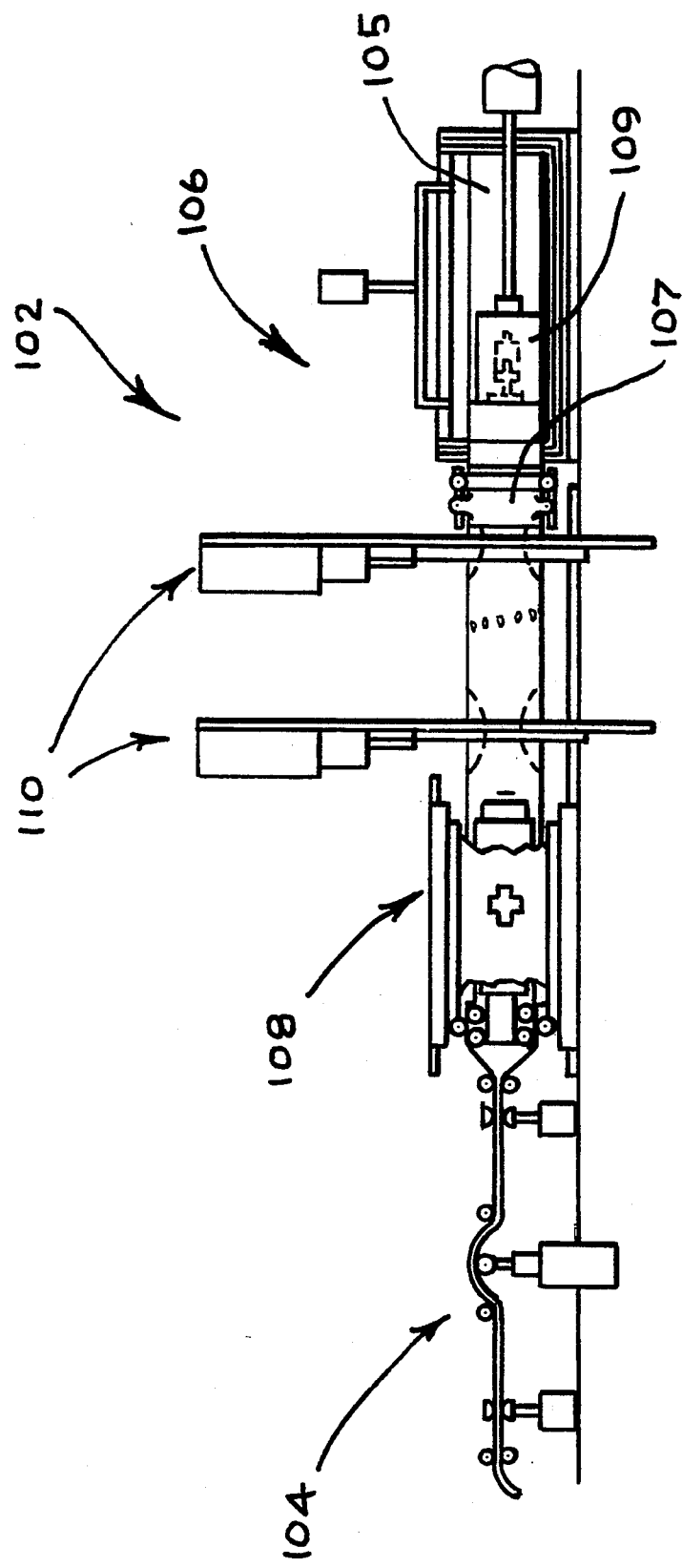
FIG. 7 is a side elevational view of a representative stuffing machine equipped with the devices of FIG. 5, and which utilizes flat reeled type casing.

The apparatus of FIG. 7 is a further representative example of a stuffing machine 102 which can be equipped with casing gathering and closing devices as previously discussed. Stuffing apparatus 102 is utilized mainly for chunk, sectioned and formed meat products, and employs flattened casing wound on a reel, instead of pleated casings folded into shirred strands. Apparatus 102 consists of the following main sections: a casing delivery section 104 for providing a supply of flattened casing for filling, usually wound on a large reel (not shown); a food delivery section 106 consisting of such key components as meat hopper 105, an extrusion nozzle or filling horn 107, and a ram 109 for directing the flow of meat through the nozzle; a casing carrier section 108 for transporting empty casing from the casing supply section 104 to the filling nozzle of the food delivery section, and product closing section 110 consisting of dual spaced devices for gathering and closing casing having the structural features previously discussed.

While the invention has been described in conjunction with various embodiments, they are illustrative only. Accordingly, many alternatives, modifications and variations will be apparent to persons skilled in the art in light of the foregoing detailed description, and it is therefore intended to embrace all such alternatives and variations as to fall within the spirit and broad scope of the appended claims.

I claim:

1. A device for gathering and closing tubular casings comprising first and second shutter assemblies, each shutter assembly comprising an angular lever having thumb and finger extensions, said levers pivotally mounted from their respective thumb extensions for circumferentially gathering casing from a casing opening therebetween, said angular levers being positioned relative to one another such that when pivoted in the same direction, travel in overlapping arcs to produce a narrowing of said casing opening as said thumb and finger extensions converge, said opening being such that the casing is gathered in an elongated elliptical shape within the opening and the angular levers are third class levers.

2. The gathering and closing device of claim 1 wherein said angular lever of said first shutter assembly includes (i) channel means for transmission of a casing fastener and for guiding a fastening ram, and (ii) a die against which a casing fastener is closed.

3. The gathering and closing device of claim 2 wherein said channel means and die are integral with the angular lever of said first shutter assembly.

4. The gathering and closing device of claim 1 in combination with a clip punch device.

5. A food casing stuffing machine in combination with the device for gathering and closing tubular casings according to claim 4.

6. A food casing stuffing machine in combination with the device for gathering and closing tubular casings according to claim 1.

7. A food casing stuffing machine in combination with the device for gathering and closing tubular casings according to claim 2.

8. The device of claim 1 wherein the angular lever of said first shutter assembly has channel means for a casing fastener and for guiding a fastening ram, a die against which a casing fastener is closed, and motor means for pivoting said levers.

9. The gathering and closing device of claim 8 wherein said angular levers are positioned relative to one another such that when actuated travel in overlapping arcs producing a narrowing of said casing opening as said thumb and finger extensions of each assembly converge when pivoted in the same direction.

10. The gathering and closing device of claim 8 wherein said channel means and die are integral with the angular lever of said first shutter assembly.

11. The gathering and closing device of claim 8 wherein said channel means is integral with said first shutter assembly and said die is non-integral.

12. The gathering and closing device of claim 8 wherein the angular lever of said first shutter assembly is substantially the same breadth as said die.

13. The gathering and closing device of claim 8 in combination with a clip punch device.

14. A food casing stuffing machine in combination with the device for gathering and closing tubular casings according to claim 13.

15. A food casing stuffing machine in combination with the device for gathering and closing tubular casings according to claim 8.

16. A food casing stuffing machine comprising a food delivery section, a product sizing section, a product closing section and a product receiving and discharging section, said product closing section comprising a horn closing and clipping device for gathering and applying a fastener onto the leading end of a food casing prior to stuffing with a meat product, and a chub closing and clipping device for gathering, closing-off and applying an end-closure fastener to the trailing end of said casing after being filled, each of said horn and chub closing and clipping devices comprising first and second motor driven shutter assemblies, each shutter assembly comprising an angular third class lever having thumb and finger extensions, said levers pivotally mounted through their respective thumb extensions for circumferentially gathering and closing casing withdrawn from a filling horn of said food delivery section, the angular levers of each of said closing and clipping devices being positioned relative to one another such that when pivoted in the same direction travel in overlapping arcs to produce a gathering of said casing to form an elongated elliptical casing closure as said thumb and finger extensions converge, and a clip punch device for delivering a casing fastener around said casing closure and for compressing said fastener.

17. The food casing stuffing machine of claim 16 wherein said first shutter assembly of said closing and clipping devices includes (i) channel means for transmission of a casing fastener and for guiding a fastening ram, and (ii) a die against which a casing fastener is closed.

18. The food stuffing machine of claim 17 including cutting means for severing casing.

19. The food casing stuffing machine of claim 17 including cutting means for severing casing between the chub fastener and the horn fastener.

20. A food casing stuffing machine comprising a casing supply section, a food delivery section, a casing carrier section for transporting casing from said casing supply section to said food delivery section, and a product closing section comprising leading and trailing devices for closing-off and applying end-closure fasteners to the leading and trailing ends of filled casings, each of said leading and trailing devices comprising first and second motor driven shutter assemblies, each shutter assembly comprising an angular lever third class having thumb and finger extensions, said levers pivotally mounted through their respective thumb extensions for circumferentially gathering and closing casing at each end of said filled food casing, the angular levers of each shutter assembly being positioned relative to one another such that when pivoted in the same direction travel in overlapping arcs to produce a gathering of casing and form an elongated elliptical casing closure at each end of said casing as said thumb and finger extensions of each assembly converge, and a clip punch device for delivering a casing fastener around said casing closure and for compressing said fastener.

21. The food casing stuffing machine of claim 20 wherein said first shutter assembly of said leading and trailing devices includes (i) channel means for transmission of a casing fastener and for guiding a fastening ram of said clip punch device, and (ii) a die against which a casing fastener is closed.

* * * * *